(12) United States Patent
Reusser et al.

(10) Patent No.: US 7,215,256 B2
(45) Date of Patent: May 8, 2007

(54) METHOD AND APPARATUS FOR DISPLAYING ATTITUDE, HEADING, AND TERRAIN DATA

(75) Inventors: Trent C. Reusser, Robbinsdale, MN (US); Thea L. Feyereisen, Hudson, WI (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 10/799,422

(22) Filed: Mar. 12, 2004

(65) Prior Publication Data
US 2005/0200502 A1    Sep. 15, 2005

(51) Int. Cl.
*G01C 23/00* (2006.01)

(52) U.S. Cl. ............... 340/975; 340/970; 340/979; 701/4; 701/14

(58) Field of Classification Search ........... 340/945, 340/971, 973, 974, 975, 980, 977, 978, 979; 701/3, 4, 14
See application file for complete search history.

(56) References Cited

U.S. PATENT DOCUMENTS

| | | | | |
|---|---|---|---|---|
| 3,449,713 A | * | 6/1969 | Kaiser | ............... 340/971 |
| 4,326,189 A | * | 4/1982 | Crane | ............... 340/973 |
| 5,736,922 A | | 4/1998 | Goode, III et al. | |
| 5,896,098 A | | 4/1999 | Goode, III et al. | |
| 5,936,552 A | * | 8/1999 | Wichgers et al. | ........... 340/963 |
| 5,978,715 A | | 11/1999 | Briffe et al. | |
| 6,038,498 A | | 3/2000 | Briffe et al. | |
| 6,054,937 A | * | 4/2000 | Von Viebahn et al. | ...... 340/961 |
| 6,057,786 A | | 5/2000 | Briffe et al. | |
| 6,112,141 A | | 8/2000 | Briffe et al. | |
| 6,405,107 B1 | * | 6/2002 | Derman | ............... 701/3 |
| 6,690,299 B1 | | 2/2004 | Suiter | |
| 6,822,624 B2 | * | 11/2004 | Naimer et al. | ............... 345/9 |
| 6,867,711 B1 | * | 3/2005 | Langner et al. | ............ 340/979 |
| 6,927,703 B2 | * | 8/2005 | Watson | ............... 340/979 |
| 2003/0132860 A1 | | 7/2003 | Feyereisen et al. | |
| 2003/0156046 A1 | * | 8/2003 | Dwyer et al. | ............... 340/973 |
| 2003/0193410 A1 | * | 10/2003 | Chen et al. | ............... 340/971 |

OTHER PUBLICATIONS

International Search Report dated Jan. 10, 2006; Application No. PCT/US2005/008362; 11 pages.

* cited by examiner

*Primary Examiner*—Brent A. Swarthout
(74) *Attorney, Agent, or Firm*—Kurt Luther, Esq.; Armstrong Teasdale LLP (57) ABSTRACT

A method for displaying attitude, heading, and navigation data on a single display is described. The method comprises configuring the display with terrain data, overlaying the terrain display with a compass rose display, and superimposing an attitude direction indicator with the compass rose display, the attitude direction indicator referenced to a center of the compass rose.

19 Claims, 8 Drawing Sheets

METHOD AND APPARATUS FOR DISPLAYING ATTITUDE, HEADING, AND TERRAIN DATA

BACKGROUND OF THE INVENTION

This invention relates generally to the configuration of aircraft cockpit displays, and more specifically, methods and apparatus for displaying attitude, heading, and terrain data.

Historically, pilots have had to use a combination of displays while flying. An attitude indicator (ADI) displays pitch and roll information for the aircraft. A horizontal situation indicator (HSI) displays compass heading and an alignment of the aircraft with certain navigational aids. A navigational display, sometimes referred to as a lateral map, provides a pilot with terrain information, waypoints, airports and other navigational aids. This multiple display arrangement requires the pilot to constantly scan multiple display units and to mentally integrate the information to provide or augment situational awareness.

In addition to the technologies described above, other advanced technology aircraft and flight deck automation, most of which provide a display to the cockpit, may tend to increase workload for the flight crew. Therefore, while the advanced technology provides higher or safer performance for an aircraft, flights crew's responsibility for correct and timely performance of those activities may not be reduced. The crew's oversight of flight deck activities may become more difficult as additional concurrent activities are performed and monitored by the same or a fewer number of people.

A controlled flight into terrain (CFIT) is a type of accident that can be difficult for a pilot or flight crew to avoid as it involves mental integration of multiple displays, for example, ADI, HSI and navigation displays. However, a CFIT can be avoided if the pilot has a proper mental picture or "situation awareness" of the aircraft's current position, trajectory, and other flight parameters in relationship to the terrain.

BRIEF SUMMARY OF THE INVENTION

In one aspect, a method for displaying attitude, heading, and navigation data on a single display is provided. The method comprises configuring the display with terrain data, overlaying the terrain display with a compass rose display, and superimposing an attitude direction indicator with the compass rose display, the attitude direction indicator referenced to a center of the compass rose.

In another aspect, a unit for displaying a navigational display is provided. The unit is configured to display a terrain, overlay a portion of the terrain display with a compass rose, and superimpose an attitude direction indicator with the compass rose. The attitude direction indicator is referenced to a center of the compass rose.

In still another aspect, a visual display format for a navigational system is provided. The visual display format comprises a terrain display, a compass rose overlaying a portion of said terrain display, and an attitude direction indicator superimposed with said compass rose, said attitude direction indicator referenced to a center of said compass rose.

DETAILED DESCRIPTION OF THE INVENTION

As described above, avoiding controlled flights into terrain (CFITs) is difficult. Occurrences of CFITs can be lessened if the pilot has a proper mental picture or "situation awareness" of the aircraft's current position in relationship to the terrain. To lessen the risks of a CFIT, the below described methods and apparatus describe an integration of both strategic and tactical terrain awareness information on a single display, as well as basic attitude information. Specifically, the integration of terrain and attitude and navigation and basic aircraft parameters (e.g., airspeed, altitude, and vertical speed) onto a single display is believed to provide a solution to help reduce occurrences of CFIT. The combination of information formally presented in separate horizontal situation indicator, navigation, and attitude indicator displays into a single display is thought to facilitate operator decoding of the attitude of the vehicle as well as ground track and relative position to terrain landmarks.

Figure 1:
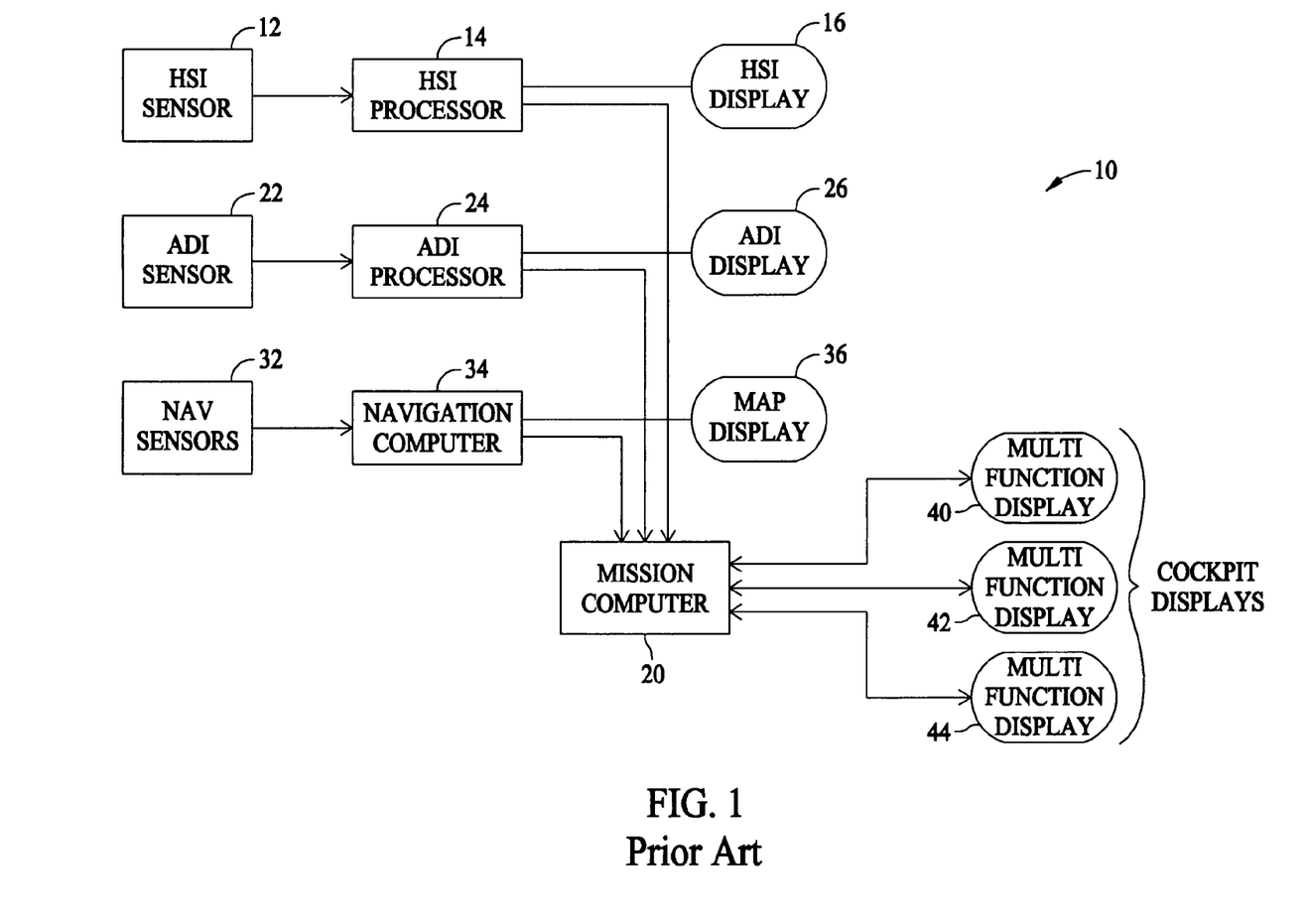
FIG. 1 is a block diagram illustrating connectivity between aircraft sensors and displays associated with the sensors.

FIG. 1 is a block diagram of a navigation and flight control system 10 illustrating connectivity between aircraft sensors and displays associated with the sensors. Specifically, a horizontal situation indicator (HSI) sensor 12 provides sensor data relating to a compass heading and alignment of the aircraft to an HSI processor 14. HSI processor 14 provides digital data relating to the compass heading and alignment of the aircraft to a HSI display 16 and also to a mission computer 20.

An attitude direction indicator (ADI) 22 provides sensor data relating to pitch and roll of the aircraft to an ADI processor 24 which provides digital data relating to pitch and roll of the aircraft to ADI display 26 and to mission computer 20. Navigation sensors 32 provide sensor data regarding terrain location to navigation computer 34. The sensor data from navigation sensors 32 is correlated with map data that is resident within navigation computer 34 to generate digital terrain data that is forwarded to navigation map display 36 and to mission computer 20. The digital terrain data includes terrain information, waypoint data, airport data, and other navigational aids.

An aircraft also typically includes one or more multi-function displays 40, 42, and 44 which receive data from mission computer 20. The data displayed by multi-function displays 40, 42, and 44 is typically based upon pilot input received at mission computer 20, for example, from push buttons (not shown) on multi-function displays (MFDs) 40, 42, and 44. In other application, a pilot can also interact with MFDs 40, 42, and 44 using a cursor control device. Activation of the push buttons or cursor control device allow a pilot to select which data is to be displayed on each of multi-function displays 40, 42, and 44. For example, multi-function display 40 can be utilized to display HSI data while multi-function display 42 displays terrain data. While multi-function displays 40, 42, and 44 are typically utilized to display the above described data, aircraft also typically include HSI display 16, ADI display 26, and navigation map display 36 (collectively referred to as dedicated displays) to provide backup to multi-function displays 40, 42, and 44. The dedicated displays may also be somewhat small and inconspicuous as compared to multi-function displays 40, 42, and 44. This arrangement of dedicated displays and multi-function displays causes the pilot to constantly scan multiple displays and forces him to mentally integrate the information from the individual displays to augment his or her situational awareness. While dedicated displays may not exist in a particular application, exclusive use of multi-functional displays 40, 42, and 44 still only provide data from a single one of HSI, ADI, and navigation data, or at most a combination of HSI and navigation data.

Figure 2:
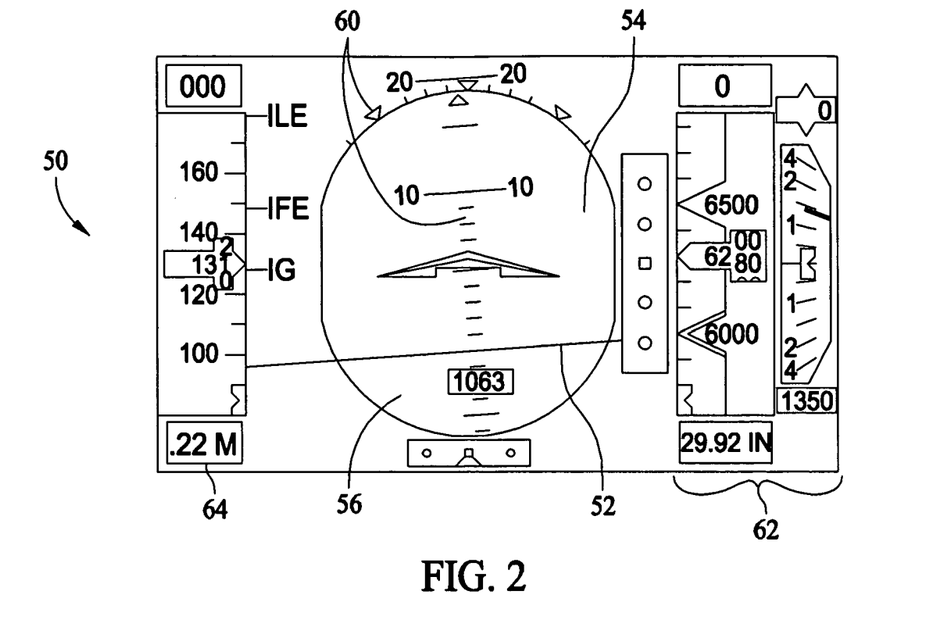
FIG. 2 is an illustration of an attitude direction indicator (ADI) display.

FIG. 2 is an illustration of an attitude direction indicator (ADI) display 50. ADI display 50 provides graphic pitch and roll information of an aircraft to a pilot. Referring to display 50, a zero pitch reference line 52 separates a positive pitch area 54 and a negative pitch area 56 of the display and grid 58 provides numerical data as to the pitch. In FIG. 2 a positive pitch of about seven degrees is indicated. A roll grid 60 provides data as to a roll of the aircraft. Display 50 also includes altitude data 62 and airspeed data 64.

Figure 3:
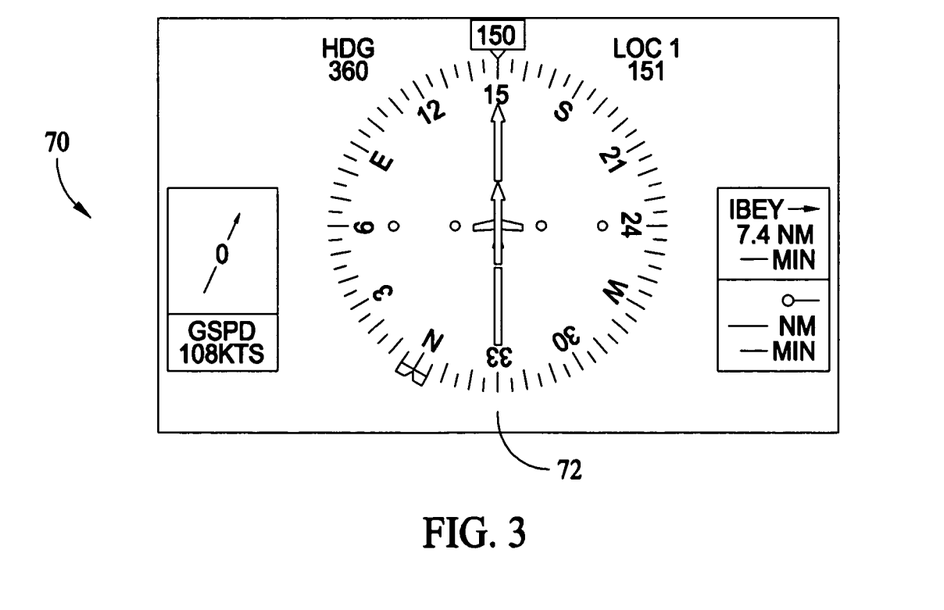
FIG. 3 is an illustration of a horizontal situation indicator (HSI) display.

FIG. 3 is an illustration of a horizontal situation indicator (HSI) display 70. HSI display 70 provides graphic compass heading and alignment for an aircraft to a pilot. In addition, HSI display 70 also provides path guidance to a selected navigation source or waypoint. For example, HSI display indicates how many "dots" you are off course (dots equate to a fraction of a degree which is dependent on the type of navigation source) or a lateral math distance off course in miles (dependent upon the type of navigation source or waypoint). Referring to display 70, compass headings 72 are provided with a zero degree north reference. Display 70 illustrates a heading for the aircraft illustrated on display 70 of 150 degrees, which is generally southeast.

Figure 4:
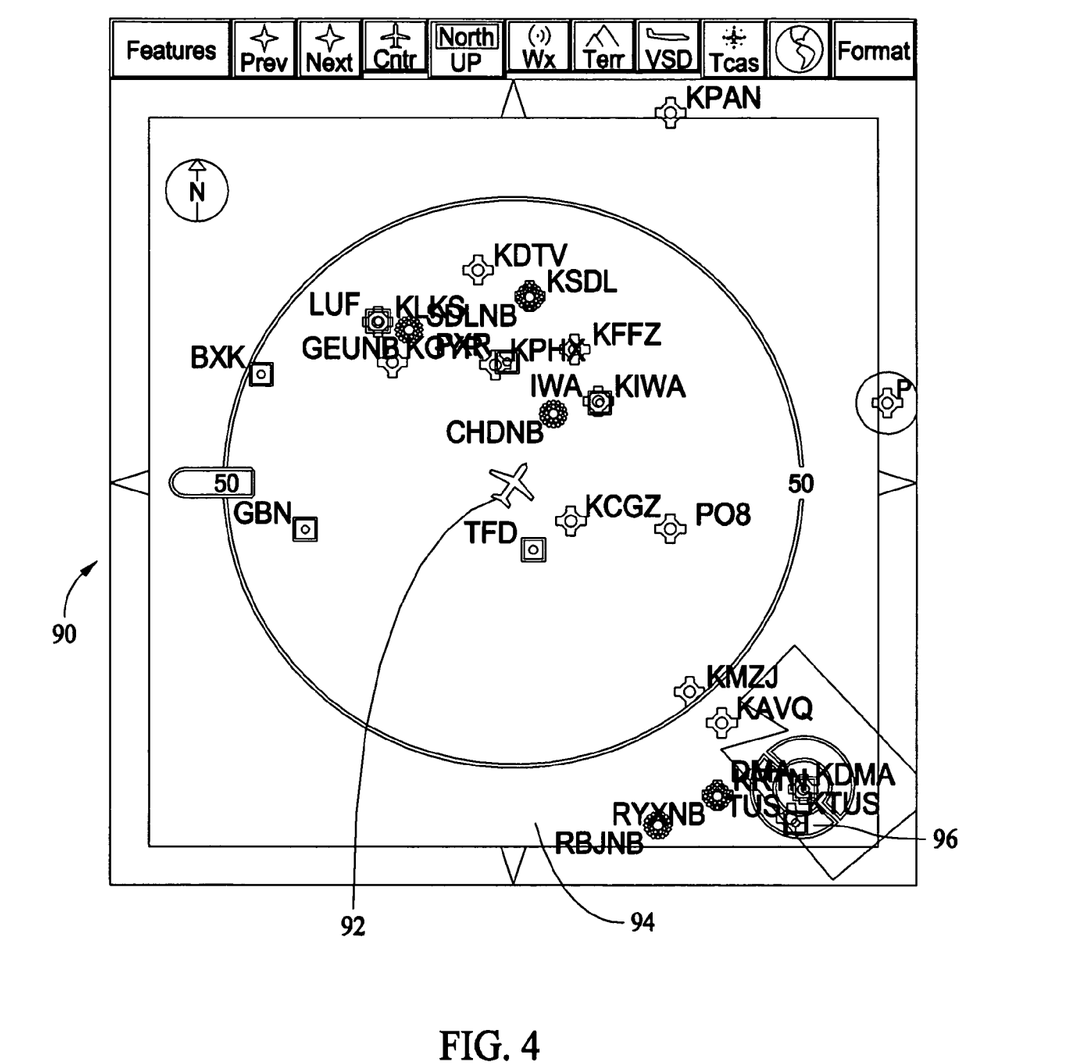
FIG. 4 is an illustration of a navigational display.

FIG. 4 is an illustration of a navigational display 90. Display 90 includes a rendering of aircraft 92 superimposed over a terrain map 94. A variety of waypoint and airport locators 96 are also superimposed over terrain map 94. Many aircraft include terrain awareness equipment which is utilized in navigation of the aircraft from point to point or in navigating to a target.

Figure 5:
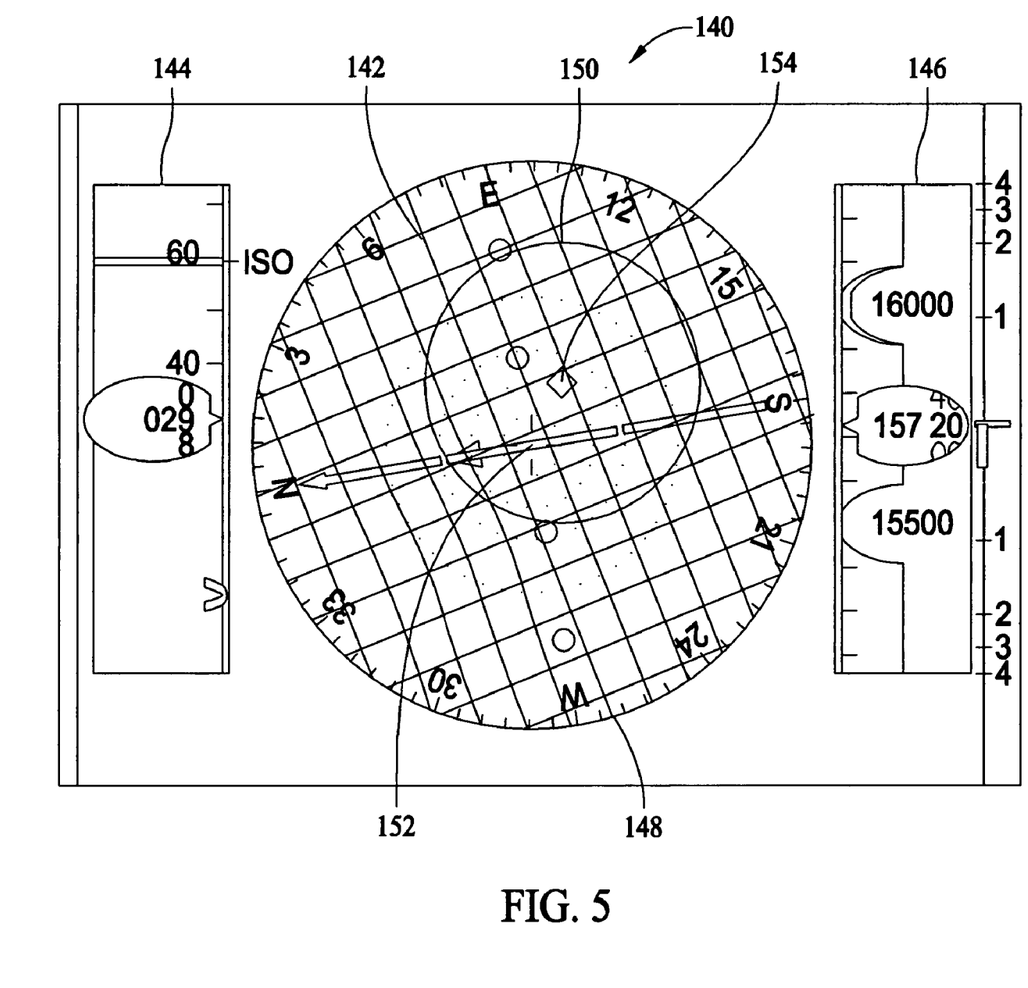
FIG. 5 is an illustration of a combined ADI, HSI, and navigational display.

FIG. 5 is an illustration of a combined ADI, HSI, and navigational display 140. As described above, the ADI, HSI, and navigation map in known systems are presented to a user in three separate displays including dedicated displays, for example, multi-function displays 40, 42, and 44, or a combination thereof. Combined ADI, HSI, and navigational display 140 merges the three separate displays into a single display format. While described herein as being applied to a pilot and aircraft situation, combined ADI, HSI, and navigational display 140 and similar displays are applicable to other vehicle navigation situations, for example, a ground operator of one or several unmanned air vehicles (UAVs).

Combined ADI, HSI, and navigational display 140 provides a top-down look onto a three dimensional rendered section of terrain 142. Superimposed on terrain 142 is an airspeed indicator 144 and an altitude indicator 146. Substantially in a center of display 140 is a 360 degree compass rose 148, which, in one embodiment, includes a translucent, circular attitude indicator ball 150. In FIG. 5, display 140 indicates a heading between 100 and 105 degrees. A displacement of attitude indicator ball 150 from a center 152 of compass rose 148, as indicated additionally by displacement of a center 154 of attitude indicator ball 150 indicates an amount of deflection in the pitch and roll axes. Additional elements that are contemplated for inclusion on display 140, but not shown in FIG. 5 include a course deviation indicator, a current and proposed ground track, and landmark/obstacle data including airports and runways.

Figure 6:
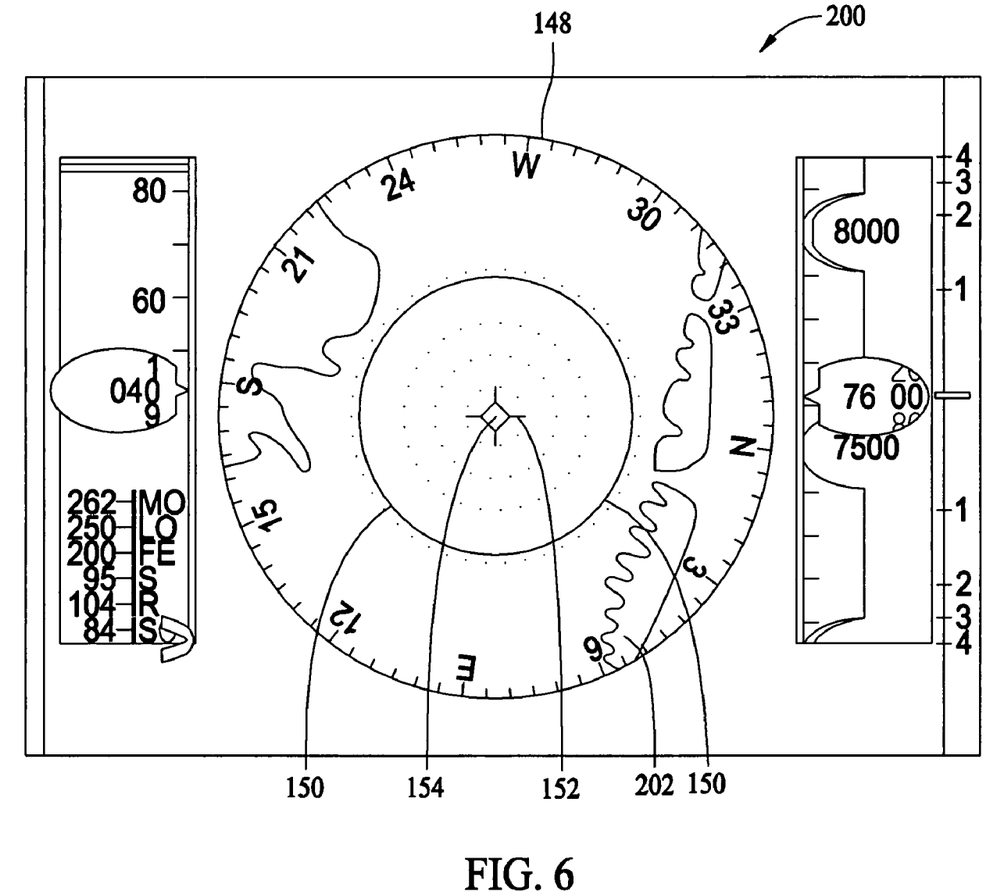
FIG. 6 is an illustration of a combined ADI, HSI, and navigational display illustrating a zero pitch and roll.

FIG. 6 is an illustration of a combined ADI, HSI, and navigational display 200 illustrating a zero degree pitch and zero degree roll. Display 200 also illustrates more defined terrain features 202 than are illustrated on display 140 (shown in FIG. 5). Center 154 of attitude indicator ball 150 is aligned within center 152 of compass rose 148 to indicate the zero degree pitch and zero degree roll of the vehicle associated with display 200.

Figure 7:
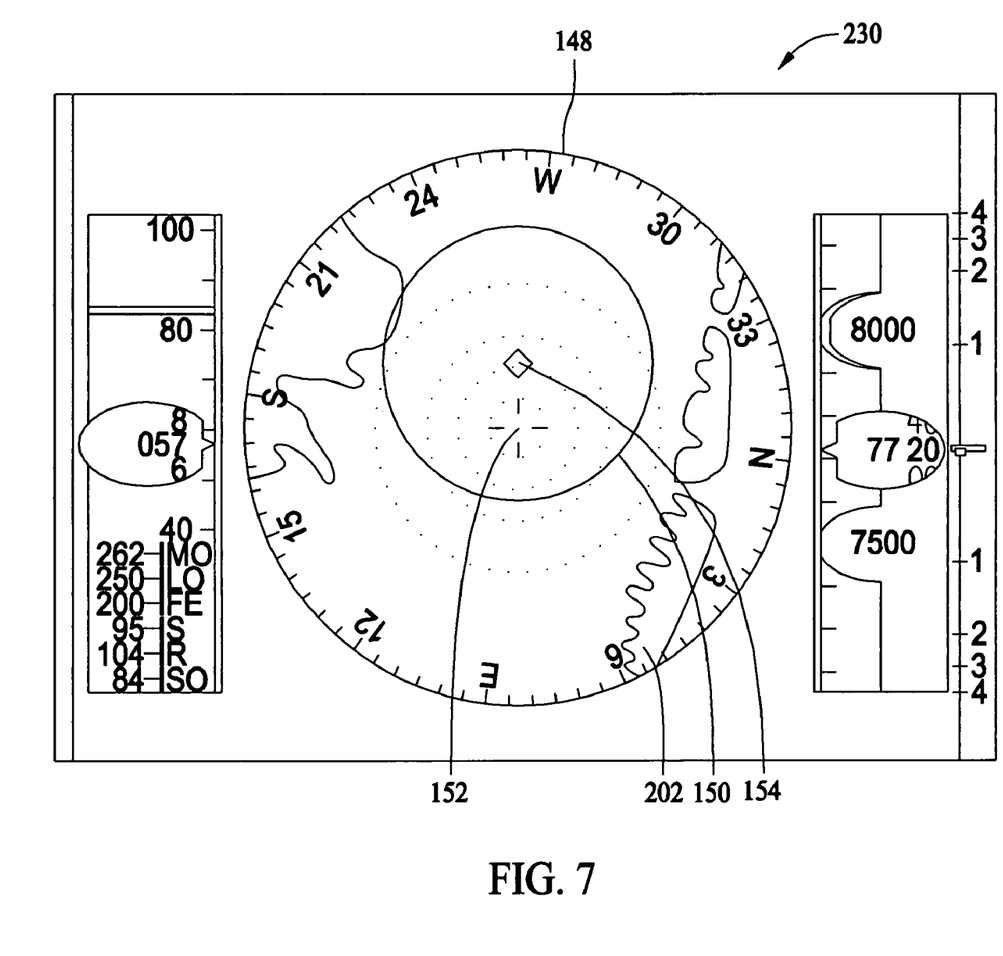
FIG. 7 is an illustration of a combined ADI, HSI, and navigational display illustrating a negative pitch and a zero roll.
Figure 8:
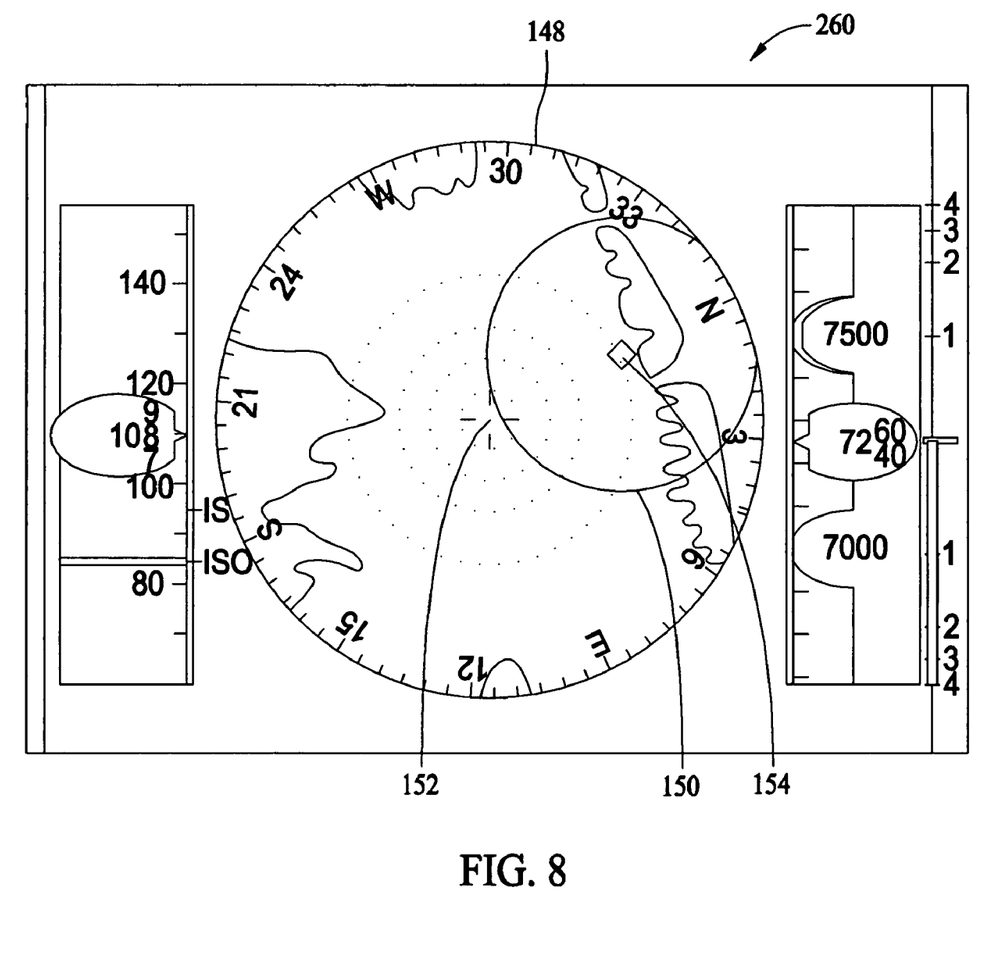
FIG. 8 is an illustration of a combined ADI, HSI, and navigational display illustrating a negative pitch and roll.

FIG. 7 is an illustration of a combined ADI, HSI, and navigational display 230 illustrating a negative pitch and a zero roll. Center 154 of attitude indicator ball 150 is directly above center 152 of compass rose 148 to indicate the negative pitch and zero roll of the vehicle associated with display 230. FIG. 8 is an illustration of a combined ADI, HSI, and navigational display 260 illustrating a negative pitch and a negative roll (i.e., a roll to the left). Center 154 of attitude indicator ball 150 is above center 152 of compass rose 148 to indicate the negative pitch and is to the right of center 152 of compass rose 148 to indicate the negative roll of the vehicle associated with display 200.

Figure 9:
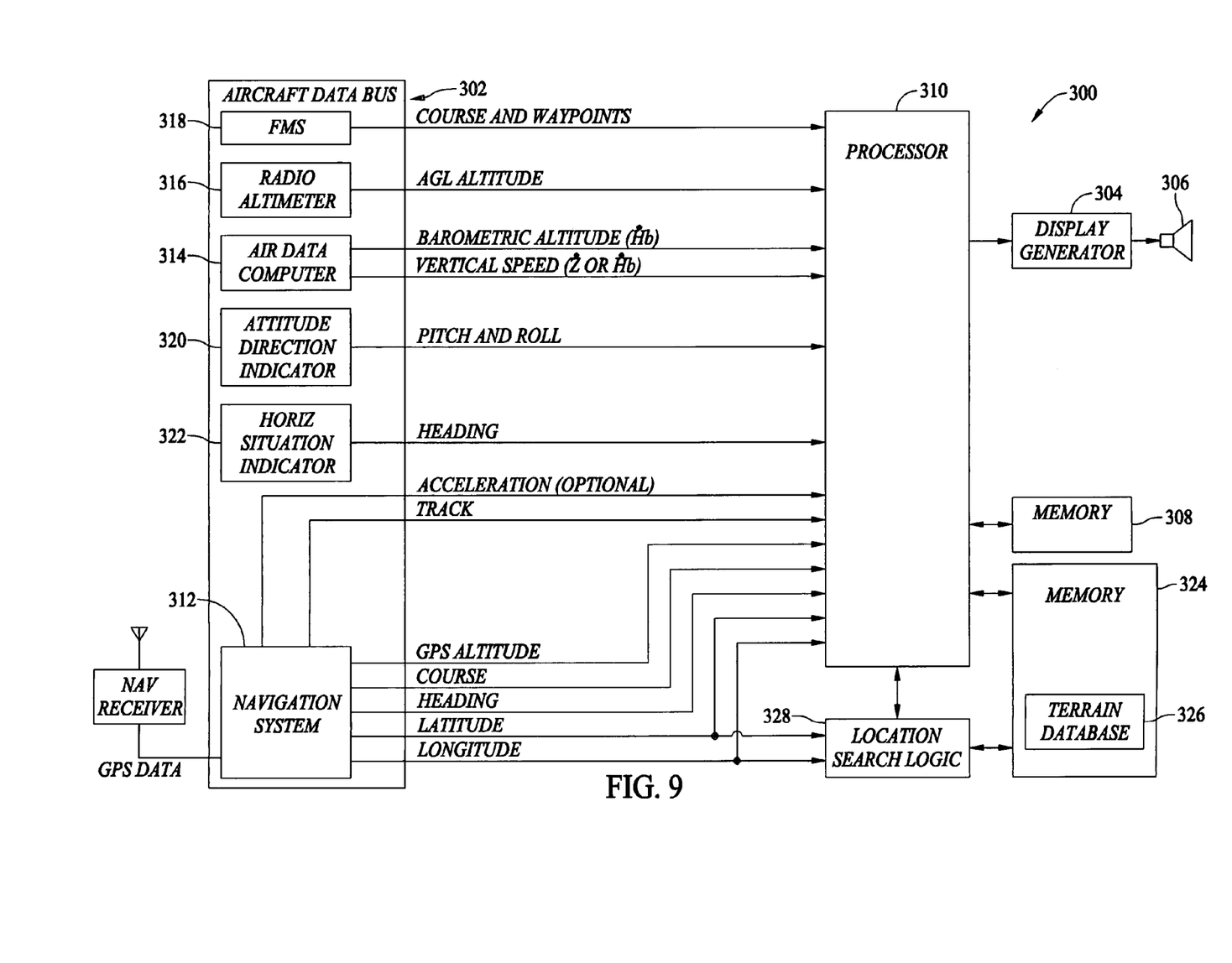
FIG. 9 is a block diagram illustrating an integrated display presentation system for dynamically displaying terrain situation awareness information, attitude and heading in an aircraft environment.

FIG. 9 illustrates, by example and without limitation, an integrated display presentation system 300 for dynamically displaying terrain situation awareness information, as well as attitude and heading reference information, in an aircraft environment embodied as a system block diagram. Display presentation system 300 dynamically displays terrain information as a function of aircraft position, and includes interfaces to subsystems for determining accurate aircraft current position and flight path information, storing and retrieving surrounding terrain data from a digital terrain database as a function of the aircraft current position information, and processing terrain data.

Integrated display 140 (shown in FIG. 5) presentation is provided as a set of machine instructions received and operated by display presentation system 300. The machine instructions include instructions for receiving data from one or more of the instrument information signals available on either an aircraft data bus 302 or another suitable means for providing a real-time electronic signal data source of instrument signals reporting flight parameter information. The instrument signals provide the various signals to integrated display presentation system 300. A detailed description of the signals available on at least one aircraft data bus 302 is provided by the ARINC Characteristic 429 as published by Aeronautical Radio, Incorporated of Annapolis, Md. Included among the signals provided by the aircraft data bus 302 or other suitable source are signals useful for operating integrated display presentation system 300, these signals including by example and without limitation, barometric and radio altitude signals, a vertical speed signal, and navigation signals, including GPS altitude, course, heading, latitude and longitude signals, track, and acceleration. While described below as system 300 causing integrated display 140 to be displayed, it is to be understood that integrated display 140 is utilized by way of example only and not meant to exclude displays 200, 230, and 260 or another similarly arranged display format.

These signals are used as inputs to an integrated display presentation circuit, which in turn is effective to generate an integrated plurality of display control signals resulting in integrated display 140. The integrated plurality of display control signals are applied to a display generator 304, that in turn generates a plurality of display control signals that result in the terrain situation awareness information, attitude information, and heading reference information (e.g., integrated display 140) being displayed on cockpit display 306.

A plurality of machine instructions are stored in an onboard memory 308, which are retrieved and operated by a computer processor 310 to generate the integrated display control signals for generating integrated display 140 or a similarly formatted display. Computer processor 310 is for example, but without limitation, a microprocessor, a digital signal processor, or another suitable processor and may be either a dedicated processor or a processor shared with other onboard equipment. Processor 310 includes inputs coupled to onboard memory 308 to receive machine instructions and inputs coupled to data bus 302 to receive sources of instrument signals reporting flight parameter information. Processor 310 uses data received from a navigation system 312 on the aircraft to provide current information about the altitude, course, heading, track, latitude and longitude and optionally acceleration of the aircraft. The navigation data may be obtained directly from the navigation system, which may include an inertial navigation system, a satellite navigation receiver such as a GPS receiver (shown), VLF/OMEGA, Loran C, VOR/DME or DME/DME, or from the Flight Management System (FMS).

Information about the pressure or barometric altitude relative to sea level, vertical speed, and current air speed of the aircraft are available from the navigation system 312, from an air data computer 314, an air data and heading reference system (ADHRS) (not shown), or from a barometric altimeter and a barometric rate circuit present on the aircraft.

Current altitude relative to the ground, i.e., AGL altitude, is provided to the integrated terrain situational awareness display presentation circuit of the invention by signals from a radio altimeter 316 which is commonly a low powered radar that measures vertical distance between the aircraft and the ground. Radio altimeters are an essential part of many avionics systems and are widely used over mountainous regions to indicate terrain clearance. Also known are laser altimeters in which a laser beam modulated by radio frequencies is directed downward and reflected from the terrain. The reflection is gathered by a telescope system, sensed with a photomultiplier, and phase compared with the original signal. Optionally, GPS altitude data is used. In another known system, an altitude estimate above the ground is based upon an algorithm that combines data from one or more of GPS, inertial sensors, and ADHRS.

A Flight Management System (FMS) 318 coupled to the data bus 302 has stored therein information about the intended course during the current flight, including information about the positions of waypoints along the aircraft's flight path. Waypoints may either be three dimensional or four dimensional (including time). Also, an attitude direction indicator 320 provides pitch and roll information for the aircraft, and a horizontal situation indicator 322 provides a compass heading of the aircraft to processor 310.

These signals available on data bus 302 are applied to processor 310 for enabling the integrated display presentation (illustrated in FIGS. 5–8) according to the different ones of attitude, heading, and the terrain situational awareness information presentation operations performed by integrated display presentation system 300 and displayed as integrated display 140 or a like display.

A memory device 324 coupled to the processor 310 stores a digital terrain database 326 as a function of position, such as latitude and longitude position data. The source of the digital terrain database 326 is, for example, a public United States Geographic Survey (USGS) having a resolution on the order of 3 arc-seconds or 90 meters, and includes topographical relief information. The terrain database may include not only the locations of natural terrain obstacles such as mountains or other high ground areas, but also man-made obstacles such as radio towers, buildings, enemy or friendly tank positions, and the like. The terrain database may also include the boundaries of restricted airspace, e.g., airspace around military installations, restricted elevations for particular airspace, airport locations, bodies of water and the like. Alternatively, the display generated using a Jeppesen supplied database of terrain and, optionally, includes topographical relief information. A location search logic device 328 is coupled between memory device 324 and processor 310 for accessing terrain database 326 during operation. Other suitable terrain databases are also known, such as the Enhanced Ground Proximity Warning System (EGPWS).

Using the data supplied by the different instrument information signals available on data bus 302, processor 310 operates one or more algorithms for generating the plurality of display control signals. The display control signals are output to display generator 304 which interprets the display control signals to generate the terrain situation awareness symbology (e.g., display 140) presented on display 306.

Integrated display presentation system 300 as embodied in FIG. 9 includes a plurality of machine instructions stored in the onboard memory 304, which are retrieved and operated by a processor 310 to generate the simulated field of view (FOV) of the terrain on display 140 (as shown in FIG. 5) or another similar display. Processor 310 also receives pitch and roll data signals from attitude direction indicator 320 from data bus 302 to provide current information about the attitude of the aircraft. Further, processor 310 also receives heading data signals from horizontal situation indicator 322 from data bus 302 to provide current information about the magnetic heading of the aircraft.

An additional plurality of machine instructions stored in the onboard memory 308 are retrieved and operated by processor 310 to retrieve real-time spatial position information available on data bus 302, such as a position defined by latitude and longitude values. As a function of the real time aircraft position information, processor 310 uses location search logic circuit 328 to retrieve terrain information from the database of terrain information 326 stored in memory device 324. The terrain information retrieved from database 326 includes at least data relevant to the terrain to the extent of the selected range within a wide-angle FOV of display 140. In other words, processor 310 retrieves terrain information projected along the current real-time heading of the host aircraft within the vertical, lateral and range extents of the displayed FOV.

In one embodiment, processor 310 operates machine instructions for determining tactical and strategic terrain awareness as a function of the terrain information relevant to the real-time spatial position, attitude, heading, optional track and acceleration, altitude above ground, and the pre-selected strategic threshold altitude, below which the terrain is categorized as strategic. The strategic terrain information awareness is coded according to a monochromatic scale that is graduated as a function of terrain elevation to develop a three-dimensional representation of the terrain relief. In other embodiments, alternative color coding schemes are utilized.

In one embodiment, tactical terrain above the pre-selected strategic threshold altitude is categorized as a function of the potential hazards presented. The tactical terrain divided into "warning," "caution," and "all clear" bands as a function of the terrain elevation relative to the aircraft's current altitude above ground. As discussed herein, the tactical terrain information is color coded relative to the aircraft's current altitude above ground based upon the pre-selected "warning," "caution," and "all clear" relative elevation thresholds. Each elevation band being coded on a graduated scale as a function of terrain elevation to develop a three-dimensional representation of the terrain relief, as discussed herein.

Optionally, processor 310 operates additional machine instructions for generating display control signals that are applied to display generator 304 to generate a plurality of display control signals that result in the updated terrain situational awareness information, as well as attitude and heading, being displayed on display 140 in real-time.

Processor 310 further operates the machine instructions to update the strategic and tactical terrain awareness information, including the coding thereof, in real-time using the real-time spatial position and heading signals received from the data bus 302 to retrieve terrain information relevant to the aircraft's current spatial position, heading and altitude. Processor 310 then generates display control signals that are applied to display generator 304 to generate a plurality of display control signals that result in the updated terrain situational awareness information being displayed on display 140 in real-time.

Integrated display presentation system 300 as embodied in FIG. 9 includes a plurality of machine instructions stored in onboard memory 308, which are retrieved and operated by a processor 310 to generate the terrain awareness information, attitude and heading on display 140 using conformal symbology, whereby outside relationships are replicated on display 140 inside the aircraft. In one embodiment, simulated terrain information is alternatively rendered on display 140 using true one-to-one mapping or a compressed mapping that maximizes the amount of information presented on display 140. Integrated display presentation system 300 thus presents terrain information using symbology that substantially mimics the form of the terrain as it appears. In addition, integrated display presentation system 300 allows a user to zoom in on or zoom out on the terrain displayed. In other words, terrain information is presented in a format consistent with an above view of the actual terrain. The conformal symbology permits the pilot to utilize pre-attentive referencing rather than making conscious decisions, thereby reducing pilot workload. The conformal symbology comment not only refers to terrain as described above, but also to obstacles, a desired path, waypoints, airports, and other objects that might be displayed by integrated display presentation system 300.

The integration of information from three separate displays as illustrated in FIGS. 2–4, into a single display (e.g., combined ADI, HSI, and navigational display 140 shown in FIG. 5) reduces pilot workload by providing a mental map that is consistent with the operator's movement through space. Therefore, by creating convergence for the information previously contained in the three separate displays, specifically, integrating attitude information with strategic and tactical terrain awareness on one display, there is less need for mental rotation and translation on the part of the pilot. The above described integration into a single display reduces pilot workload, facilitates situational assessment, and reduces pilot error, increasing safety for flights into terrains.

While the invention has been described in terms of various specific embodiments, those skilled in the art will recognize that the invention can be practiced with modification within the spirit and scope of the claims.

What is claimed is:

1. A method for displaying attitude, heading, and navigation data on a single display comprising:
   configuring the display with a top-down view of a terrain;
   overlaying a portion of the terrain display with a compass rose display; and
   superimposing an attitude direction indicator with the compass rose display, the attitude direction indicator referenced to a center of the compass rose, wherein displacement of a center of the attitude direction indicator with respect to a center of compass rose indicates an amount of deflection in pitch and roll axes.

2. A method according to claim 1 further comprising overlaying a portion of the terrain display with an airspeed indicator.

3. A method according to claim 1 further comprising overlaying a portion of the terrain display with at least one of an altitude indicator and a vertical speed indicator.

4. A method according to claim 1 further comprising overlaying a portion of the terrain display with at least one of a course deviation indication, a current ground track, a proposed ground track, and landmark and obstacle data.

5. A unit for displaying a navigational display, said unit configured to display a top-down view of a terrain, overlay a portion of the terrain display with a compass rose, and superimpose an attitude direction indicator with the compass rose, the attitude direction indicator referenced to a center of the compass rose, wherein displacement of a center of the attitude direction indicator with respect to the compass rose indicates an amount of deflection in pitch and roll axes.

6. A unit according to claim 5 wherein said unit is further configured to overlay at least one of an airspeed indication and an altitude indication over a portion of the terrain display.

7. A unit according to claim 5 wherein said terrain display comprises a top-down view onto a three dimensional section of terrain.

8. A unit according to claim 5 wherein said attitude direction indicator comprises an attitude indicator that is at least one of translucent and circular.

9. A unit according to claim 5 wherein said unit is further configured to display at least one of a course deviation indication, a current ground track, a proposed ground track, and landmark and obstacle data.

10. A unit according to claim 9 wherein said landmark and obstacle data comprises data relating to at least one of airports and runways.

11. A visual display format for a navigational system comprising:
   a top-down view terrain display;
   a compass rose overlaying a portion of said terrain display; and
   an attitude direction indicator superimposed with said compass rose, said attitude direction indicator referenced to a center of said compass rose, wherein displacement of a center of the attitude direction indicator with respect to a center of the compass rose indicates an amount of deflection in pitch and roll axes.

12. A visual display format according to claim 11 wherein said unit is further configured to overlay at least one of an airspeed indication and an altitude indication over a portion of the terrain display.

13. A visual display format according to claim 11 wherein said terrain display comprises a top-down onto a three dimensional section of terrain display.

14. A visual display format according to claim 11 wherein said attitude direction indicator comprises a translucent, circular attitude indicator.

15. A visual display format according to claim 11 further comprising at least one of a course deviation indication, a current ground track, a proposed ground track, and landmark and obstacle data.

16. A visual display format according to claim 15 wherein said landmark and obstacle data comprises data relating to at least one of airports and runways.

17. A display control device, comprising:
  a processor structured for receiving terrain awareness information and samples of current heading and attitude; and
  one or more algorithms resident on said processor for generating, as a function of the current heading and attitude, one or more display control signals for causing a display device to display a top-down view of a portion of the terrain awareness information and information relating to heading and attitude, the display control signals causing the attitude information to be referenced to a center of the heading information, and the attitude and heading information to overlay the terrain awareness information, wherein the attitude information includes an attitude direction indicator and displacement of a center of the attitude direction indicator with respect to a center of the heading information indicates an amount of deflection in pitch and roll axes.

18. The display control device of claim 17 wherein said processor receives samples relating to at least one of airspeed and altitude, said one or more algorithms resident on said processor one or more display controls for causing a display device to display at least one of an airspeed and an altitude.

19. The display control device of claim 17 wherein said processor receives samples relating to at least one of course deviation, current and proposed ground track, and landmark data, said one or more algorithms resident on said processor one or more display controls for causing a display device to display at least one of a course deviation indicator, a current and a proposed ground track, and landmark data.

* * * * *